(No Model.)
O. W. WALSCHEID.
WRINGER ROLLER.
No. 503,019. Patented Aug. 8, 1893.
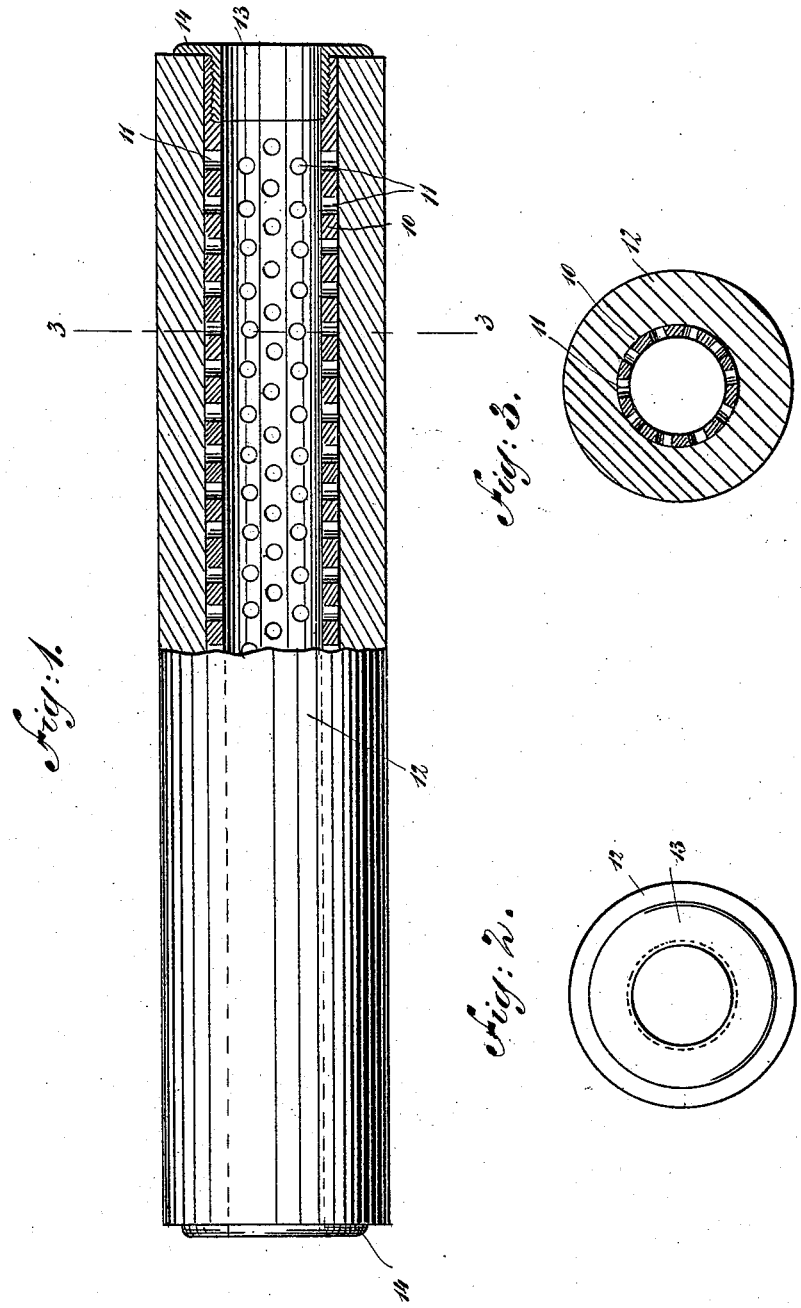
WITNESSES:
Chas. Nider
E. M. Clark
INVENTOR
O. W. Walscheid
BY Munn & Co
ATTORNEYS.

UNITED STATES PATENT OFFICE.

OTTO W. WALSCHEID, OF JERSEY CITY, NEW JERSEY.

WRINGER-ROLLER.

SPECIFICATION forming part of Letters Patent No. 503,019, dated August 8, 1893.

Application filed August 20, 1892. Serial No. 443,655. (No model.)

*To all whom it may concern:*

Be it known that I, OTTO W. WALSCHEID, of Jersey City, in the county of Hudson and State of New Jersey, have invented a new and Improved Wringer-Roller, of which the following is a full, clear, and exact description.

It has been found in practice that the rubber roller on the driving shaft of friction wringers—i. e., those without cogs attached—and of such wringers as have two cogs attached to each shaft, the driving shaft roller has to be replaced several times before the other is worn out. It has also been found that the roller on purchase-gear wringers which is moved directly by the pinions of such wringers, wears out much sooner than the one more indirectly moved. This is occasioned in the friction wringer by having no cogs, and in the cog wheel wringer by the cogs getting out of gear, and in the purchase-gear wringer by the direct application of the pinion to the shaft roller.

The object of my invention is to obviate this difficulty and to construct a roller that will cost but little more and overcome the friction strain by the slipping on the shaft of the strain bearing sleeve of the roller.

To this end my invention consists in a wringer roller, the construction of which will be hereinafter described and claimed.

Reference is to be had to the accompanying drawings forming a part of this specification, in which similar figures of reference indicate corresponding parts in all the views.

Figure 1 is a broken plan, partly in longitudinal section, of the roller embodying my invention. Fig. 2 is an end view of the same; and Fig. 3 is a cross section on the line 3—3 in Fig. 1.

The roller has an inner sleeve 10, which is preferably made of metal and which is sufficiently strong to withstand the pressure on the roller and to hold its cylindrical shape. The sleeve is provided with numerous perforations 11, and when the rubber roller 12, is secured to the sleeve, the rubber will become embedded in the perforations and consequently the roller will not slip on the sleeve. It will be understood, however, that the perforations may be omitted and the sleeve and roller will still work successfully. At the ends of the sleeve are cylindrical nuts 13, which are screwed into the sleeve, and the nuts are arranged so that their inner walls will form a continuation of the inner wall of the sleeve, as shown in Fig. 1. The nuts have end flanges 14, which abut with the ends of the roller 12 and prevent the same from spreading longitudinally. The roller may be used in a wringer of any kind, and it is applied by simply slipping the sleeve 10 upon that shaft of the wringer when it is opposite the shaft to which the power is most directly applied. If desired, the bearing sleeve may be grooved on the side next the rubber, and the grooves will have the same effect as the perforations.

Having thus described my invention, I claim as new and desire to secure by Letters Patent—

The combination with a rubber roller of a wringer, of a bearing sleeve held within the roller and adapted to turn loosely on the shaft of the wringer, and end nuts screwed into the sleeve and provided with flanges to abut with the ends of the roller, substantially as described.

OTTO W. WALSCHEID.

Witnesses:
WARREN B. HUTCHINSON,
C. SEDGWICK.